(12) United States Patent
Atarashi et al.

(10) Patent No.: US 7,977,843 B2
(45) Date of Patent: *Jul. 12, 2011

(54) AXIAL GAP TYPE MOTOR

(75) Inventors: Hirofumi Atarashi, Shioya-gun (JP); Shoei Abe, Kawachi-gun (JP); Keiichi Yamamoto, Haga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 67 days.

This patent is subject to a terminal disclaimer.

(21) Appl. No.: 12/244,448

(22) Filed: Oct. 2, 2008

(65) Prior Publication Data

US 2009/0243422 A1 Oct. 1, 2009

(30) Foreign Application Priority Data

Oct. 4, 2007 (JP) ................................. 2007-261169
Nov. 27, 2007 (JP) ................................. 2007-305945

(51) Int. Cl.
*H02K 1/27* (2006.01)
*H02K 21/24* (2006.01)

(52) U.S. Cl. .......... 310/216.074; 310/216.111; 310/267; 310/268

(58) Field of Classification Search ............. 310/156.12, 310/156.32, 156.35, 156.38, 156.43, 156.82, 310/166, 168, 216.069–216.075, 216.111, 310/216.112, 267–268
See application file for complete search history.

(56) References Cited

U.S. PATENT DOCUMENTS

| 336,087 A | 2/1886 | Brush |
|---|---|---|
| 2,154,146 A | 4/1939 | Becker |
| 2,632,861 A | 3/1953 | Morton et al. |
| 3,108,200 A | 10/1963 | Baldwin |
| 3,465,188 A | 9/1969 | Sisk |
| 3,591,819 A | 7/1971 | Laing et al. |
| 3,762,042 A | 10/1973 | Abe et al. |
| 3,956,651 A | 5/1976 | Brammerlo |
| 4,007,387 A | 2/1977 | Rustecki |

(Continued)

FOREIGN PATENT DOCUMENTS

EP 1612913 A2 1/2006

(Continued)

OTHER PUBLICATIONS

U.S. Appl. No. 12/244,448.

(Continued)

*Primary Examiner* — Tran N Nguyen
(74) *Attorney, Agent, or Firm* — Arent Fox, LLP

(57) ABSTRACT

The axial gap type motor according to the present invention is provided with: a rotor and a first stator and a second stator, wherein the first and second stators includes an annular back yoke and a plurality of teeth which is provided on the annular back yoke at predetermined intervals in a peripheral direction so as to protrude toward the rotor in the direction of the rotation axis; the peripheral pitch of the plurality of teeth of the first and second stators are equal to each other; and in a case where the first stator and the second stator which sandwich the rotor therebetween in the direction of the rotation axis are seen from one side in the direction of the rotation axis, facing surfaces of the teeth of the first and second stators which face to the rotor are formed so as not to overlap completely each other.

6 Claims, 8 Drawing Sheets

U.S. PATENT DOCUMENTS

| | | | |
|---|---|---|---|
| 4,095,150 A * | 6/1978 | Senckel | 310/12.24 |
| 4,363,988 A | 12/1982 | Kliman | |
| 4,410,820 A | 10/1983 | Stanley | |
| 4,864,175 A | 9/1989 | Rossi | |
| 4,996,457 A | 2/1991 | Hawsey et al. | |
| 5,142,179 A | 8/1992 | Nakamura et al. | |
| 5,245,238 A | 9/1993 | Lynch et al. | |
| 5,334,899 A | 8/1994 | Skybyk | |
| 5,387,854 A | 2/1995 | McCleer et al. | |
| 5,394,321 A | 2/1995 | McCleer et al. | |
| 5,397,953 A | 3/1995 | Cho | |
| 5,642,009 A | 6/1997 | McCleer et al. | |
| 5,671,524 A | 9/1997 | Damsky et al. | |
| 5,731,649 A | 3/1998 | Caamano | |
| 5,757,108 A | 5/1998 | Suzuki | |
| 5,907,210 A | 5/1999 | Chaix | |
| 5,925,965 A * | 7/1999 | Li et al. | 310/268 |
| 5,955,809 A * | 9/1999 | Shah | 310/198 |
| 6,034,459 A | 3/2000 | Matsunobu et al. | |
| 6,373,162 B1 * | 4/2002 | Liang et al. | 310/156.53 |
| 6,739,034 B2 | 5/2004 | Suzuki et al. | |
| 6,809,453 B2 | 10/2004 | Narita et al. | |
| 6,919,663 B2 | 7/2005 | Iles-Klumpner | |
| 6,960,860 B1 | 11/2005 | DeCristofaro et al. | |
| 6,995,494 B2 | 2/2006 | Haugan et al. | |
| 7,144,468 B2 | 12/2006 | Decristofaro et al. | |
| 7,230,359 B2 | 6/2007 | Iles-Klumpner | |
| 7,230,361 B2 | 6/2007 | Hirzel | |
| 7,315,102 B2 * | 1/2008 | Minagawa | 310/156.32 |
| 7,355,311 B2 | 4/2008 | Shimizu | |
| 7,679,260 B2 * | 3/2010 | Yamamoto et al. | 310/268 |
| 7,737,594 B2 | 6/2010 | Abe et al. | |
| 2004/0070307 A1 | 4/2004 | Haugan et al. | |
| 2005/0194855 A1 | 9/2005 | Hasebe et al. | |
| 2005/0285467 A1 * | 12/2005 | Shimizu | 310/156.35 |
| 2006/0028093 A1 | 2/2006 | Minagawa et al. | |
| 2006/0238056 A1 | 10/2006 | Alvarez et al. | |
| 2006/0273676 A1 | 12/2006 | Naruse et al. | |
| 2006/0284507 A1 | 12/2006 | Murakami | |
| 2007/0018520 A1 * | 1/2007 | Kaneko et al. | 310/156.35 |
| 2007/0080598 A1 | 4/2007 | Naruse | |
| 2007/0170802 A1 | 7/2007 | Potoradi | |
| 2008/0129136 A1 * | 6/2008 | Abe et al. | 310/156.35 |
| 2008/0290752 A1 * | 11/2008 | Yamamoto et al. | 310/156.36 |
| 2009/0243422 A1 * | 10/2009 | Atarashi et al. | 310/216.074 |
| 2009/0251021 A1 | 10/2009 | Atarashi et al. | |
| 2009/0295245 A1 * | 12/2009 | Abe et al. | 310/156.35 |
| 2009/0295246 A1 * | 12/2009 | Abe | 310/156.35 |
| 2010/0090555 A1 * | 4/2010 | Tajima et al. | 310/156.35 |
| 2010/0117474 A1 | 5/2010 | Atarashi et al. | |
| 2010/0141075 A1 | 6/2010 | Atarashi et al. | |
| 2010/0187933 A1 | 7/2010 | Yamamoto et al. | |
| 2010/0219710 A1 | 9/2010 | Kawamura et al. | |
| 2010/0231079 A1 | 9/2010 | Abe et al. | |

FOREIGN PATENT DOCUMENTS

| | | |
|---|---|---|
| EP | 1850451 A1 | 10/2007 |
| JP | 55-053161 A | 4/1980 |
| JP | 59-144352 A | 8/1984 |
| JP | 59-230453 A | 12/1984 |
| JP | 2-79174 U | 6/1990 |
| JP | 6-500457 A | 1/1994 |
| JP | 6-205554 A | 7/1994 |
| JP | 9-168263 A | 6/1997 |
| JP | 10-164779 | 6/1998 |
| JP | 10-271784 A | 10/1998 |
| JP | 3062085 U | 6/1999 |
| JP | 11-299199 | 10/1999 |
| JP | 11-511948 A | 10/1999 |
| JP | 2000-197301 A | 7/2000 |
| JP | 2000-262026 A | 9/2000 |
| JP | 2001-057753 A | 2/2001 |
| JP | 2001-136721 A | 5/2001 |
| JP | 2001-251817 | 9/2001 |
| JP | 2002-112481 A | 4/2002 |
| JP | 2005-143288 | 2/2005 |
| JP | 2005-094955 A | 4/2005 |
| JP | 2005-269778 A | 9/2005 |
| JP | 2005-304245 A | 10/2005 |
| JP | 2005-318782 A | 11/2005 |
| JP | 2005-341696 A | 12/2005 |
| JP | 2006-25482 A | 1/2006 |
| JP | 2006-166635 A | 6/2006 |
| JP | 2006-222131 A | 8/2006 |
| JP | 2006-527578 A | 11/2006 |
| JP | 2006-345627 A | 12/2006 |
| JP | 2007-028868 A | 2/2007 |
| JP | 2007-37210 A | 2/2007 |
| JP | 2007-53844 A | 3/2007 |
| JP | 2007-089270 A | 4/2007 |
| JP | 2007-104819 A | 4/2007 |
| JP | 2007-151321 | 6/2007 |
| JP | 2007-215291 A | 8/2007 |
| JP | 2008-22663 A | 1/2008 |
| JP | 2008-48497 A | 2/2008 |
| JP | 2008-104278 A | 5/2008 |
| JP | 2008-167639 A | 7/2008 |
| WO | WO 92/20131 | 12/1992 |
| WO | WO 96/29774 A1 | 9/1996 |
| WO | WO 2004/109894 A1 | 12/2004 |
| WO | WO 2006/077812 A1 | 7/2006 |
| WO | WO 2007/091727 A1 | 8/2007 |

OTHER PUBLICATIONS

Z.Q. Zhu, Influence of Design Parameters on Cogging Torque in Permanent Magnet Machines, IEEE Transactions on Energy Conversion, vol. 15, No. 4, Dec. 2000, pp. 407-412.

United States Official Office Action dated Mar. 29, 2011, issued in U.S. Appl. No. 12/457,106, 17 pages total.

United States Official Office Action dated Apr. 11, 2011, issued in U.S. Appl. No. 12/670,601, 12 pages total.

* cited by examiner

AXIAL GAP TYPE MOTOR

Priority is claimed on Japanese Patent Application No. 2007-261169, filed on Oct. 4, 2007, and Japanese Patent Application No. 2007-305945, filed on Nov. 27, 2007, the contents of which are incorporated herein by reference.

BACKGROUND OF THE INVENTION

1. Field of the Invention

The present invention relates to an axial gap type motor.

2. Description of the Related Art

Conventionally, for example, an axial-gap-type permanent magnet synchronous machine which includes a pair of stators arranged to face each other so as to sandwich a rotor therebetween in the direction of a rotation axis and which forms a magnetic flux loop via the pair of stators in a field magnetic flux by the permanent magnets of the rotor is known (for example, refer to Japanese Unexamined Patent Application, First Publication No. H10-271784 and Japanese Unexamined Patent Application, First Publication No. 2001-136721).

Meanwhile, in the permanent magnet synchronous machine related to the above conventional technique, the torque which can be output can be increased by making the field magnetic fluxes by the permanent magnets of the rotor magnetized in the direction of the rotation axis interlinked to stator windings of each stator so as to be efficiently swept between the pair of stators. However, it is desirable that occurrence of cogging torque and torque ripples resulting from a magnetic attraction force which acts in the rotational direction of the rotor is suppressed.

The present invention has been made in view of the above situations, and aims at providing an axial gap type motor which can suppress occurrence of cogging torque and torque ripples.

SUMMARY OF THE INVENTION

In order to solve the above problem and achieve the relevant object, the axial gap type motor according to the present invention is provided with: a rotor rotatable around a rotation axis; and a first stator and a second stator arranged so as to sandwich the rotor therebetween in the direction of the rotation axis, wherein: the first and second stators includes an annular back yoke and a plurality of teeth which is provided on the annular back yoke at predetermined intervals in a peripheral direction of the back yoke so as to protrude toward the rotor in the direction of the rotation axis; the peripheral pitch of the plurality of teeth of the first stator and the peripheral pitch of the plurality of teeth of the second stator are equal to each other; and in a case where the first stator and the second stator which sandwich the rotor therebetween in the direction of the rotation axis are seen from one side in the direction of the rotation axis, facing surfaces of the teeth of the first stator which face to the rotor and facing surfaces of the teeth which face to the second stator are formed so as not to overlap completely each other.

It may be arranged such that the peripheral width of the teeth of the first stator is greater than the peripheral width of the teeth of the second stator, and the width of a slot which is the space between the adjacent teeth in the peripheral direction of the first stator is smaller than the width of a slot which is the space between the adjacent teeth in the peripheral direction of the second stator.

In this case, with respect to the first stator and the second stator, the peripheral widths and the slot widths of the teeth are set to mutually different values in a state where the peripheral pitches of the teeth are made equal to each other. As a result, the coincidence between the peripheral positions of peripheral ends of the teeth can be prevented. Moreover, an increase in cogging torque and torque ripples can be suppressed.

It may be arranged such that the number of turns of stator windings mounted on the slot of the first stator is equal to the number of turns of stator windings mounted on the slot of the second stator, and the depth of the slot of the first stator in the direction of the rotation axis is greater than the depth of the slot of the second stator in the direction of the rotation axis.

In this case, the slot width in the first stator becomes relatively smaller compared with that in the second stator. Accordingly, the depth of the slot in the direction of the rotation axis becomes relatively greater compared with that of the slot in the second stator. Thereby, the numbers of turns of the stator windings which are mounted to the slot, respectively, are equal to each other, and the electric current application states to the stator windings can be set to be in the same state.

It may be arranged such that the thickness of the back yoke of the first stator in the direction of the rotation axis is greater than the thickness of the back yoke of the second stator in the direction of the rotation axis.

In this case, as the peripheral width of the teeth of the first stator becomes relatively greater compared with that of the teeth of the second stator, the thickness of the back yoke of the first stator in the direction of the rotation axis becomes relatively greater compared with that of the back yoke of the second stator. As a result, the magnetic flux density between the back yokes of the stators is equalized, and a desired magnetic circuit can be made proper. Further, passing of a magnetic flux in an unintended direction, such as a radial direction, is prevented, and a desired torque can be easily ensured.

It may be arranged such that the plurality of teeth of the first stator and second stator are inclined by a predetermined skew angle with respect to the radial direction, and in a case where the first stator and the second stator which sandwich the rotor therebetween in the direction of the rotation axis are seen from one side in the direction of the rotation axis, the inclination angles of the teeth of the first stator and the teeth of the second stator with respect to the radial direction are opposite directions from each other.

In this case, in a case where the first stator and the second stator which sandwich the rotor therebetween in the direction of the rotation axis are seen from one side in the direction of the rotation axis, the teeth of the first stator and the teeth of the second stator are arranged in a skew state where they are inclined in directions opposite to each other. As a result, for example, compared with the case where the skew angle is zero, occurrence of overlapping of peripheral edges of the teeth of the first stator and peripheral edges of the teeth of the second stator can be suppressed. Also, sudden changes in the magnetic resistance between the rotor and the stators during the rotation of the rotor can be suppressed and cogging torque and torque ripples can be reduced.

It may be arranged such that the teeth of the first stator and the teeth of the second stator have a phase difference of ½ of the peripheral pitch of the plurality of the teeth of the first stator and the second stator.

In this case, the teeth of the first stator and the teeth of the second stator have a phase difference of ½ of the teeth pitch. As a result, in a case where the first stator and the second stator which sandwich the rotor therebetween in the direction of the rotation axis are seen from one side in the direction of the rotation axis, occurrence of overlapping of the peripheral edges of the teeth of the first stator and the peripheral edges of the teeth of the second stator can be further suppressed. Cogging torque and torque ripples can also be further reduced.

It may be arranged such that the rotor includes: a plurality of main permanent magnets, whose magnetizing direction is the direction of the rotation axis, are arranged in the peripheral direction; and a plurality of auxiliary permanent magnets, whose magnetizing direction is an orthogonal direction to the direction of the rotation axis, are arranged in the vicinity of ends of the main permanent magnets.

In this case, field magnetic fluxes can be swept between the first stator and the second stator which makes a pair in the direction of the rotation axis while the magnetic fluxes of the main permanent magnets and the auxiliary permanent magnets are made to converge properly by a magnetic flux lens effect obtained by a so-called Halbach arrangement of permanent magnets. As a result, the amount of magnetic fluxes interlinked to the stator windings of the stators can be efficiently while the cogging torque and torque ripples are reduced.

DETAILED DESCRIPTION OF THE INVENTION

Hereinafter, a first embodiment of an axial gap type motor of the present invention will be described with reference to the accompanying drawings.

Figure 1:
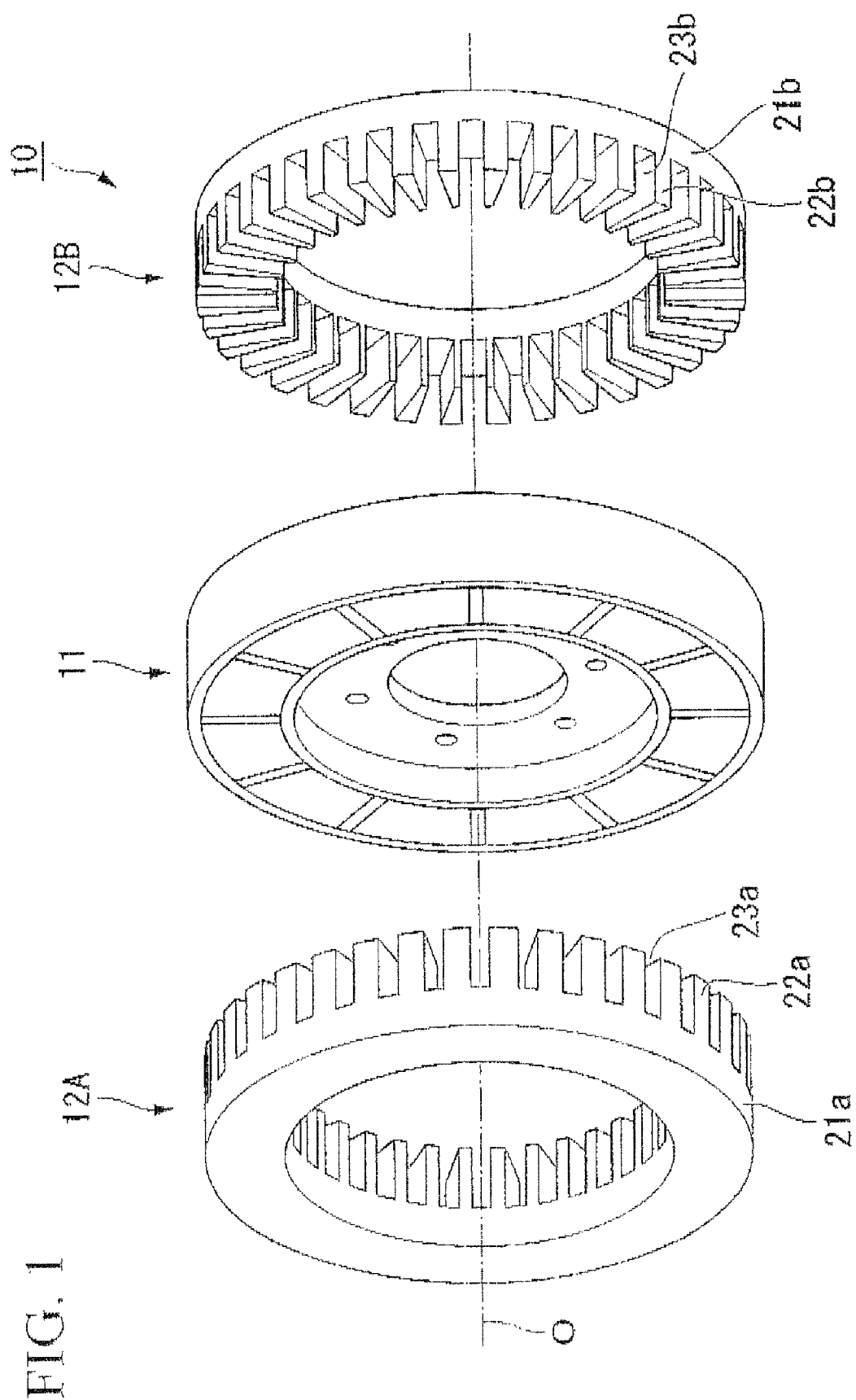
FIG. 1 is an exploded perspective view of an axial gap type motor related to one embodiment of the invention.
Figure 2:
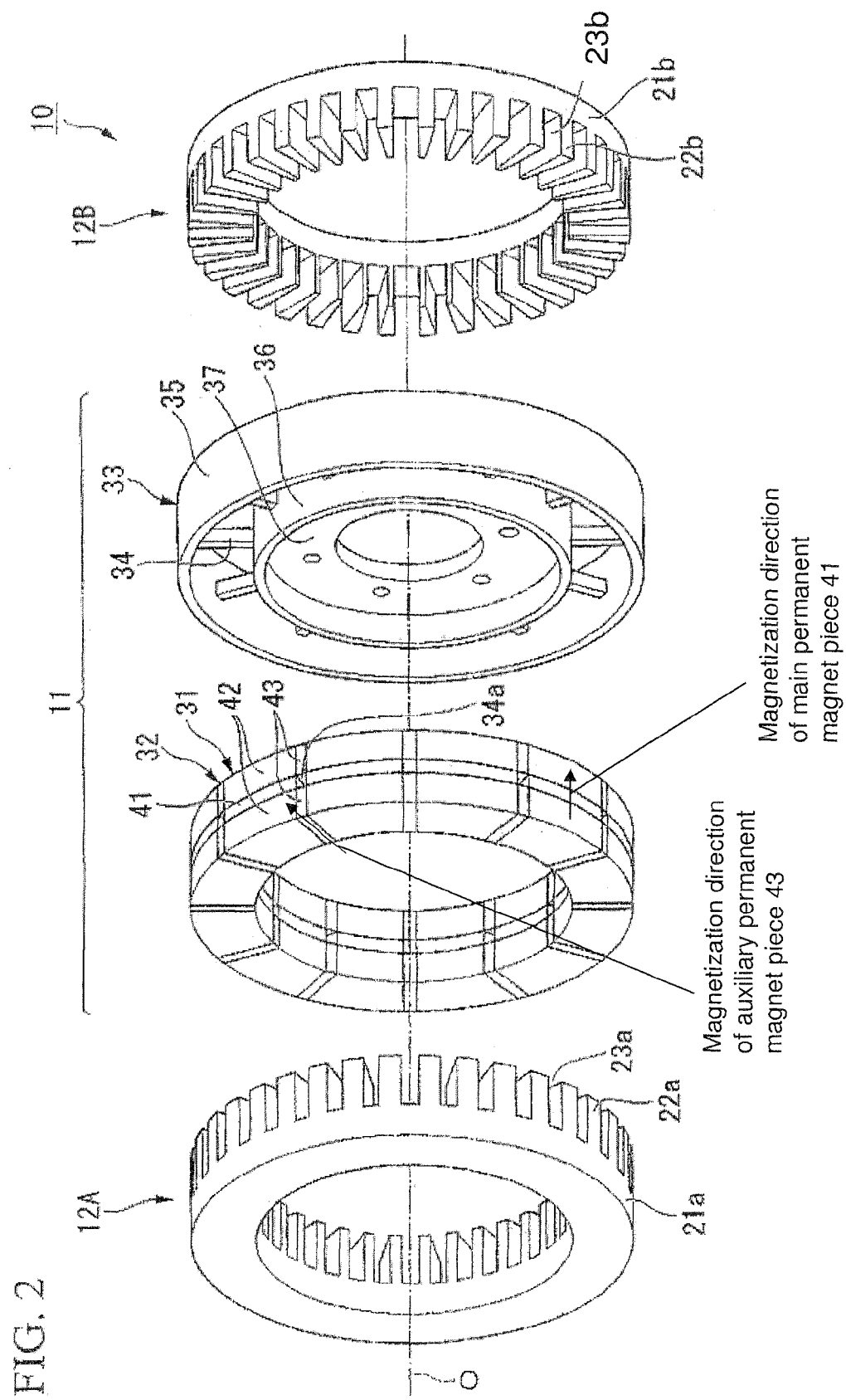
FIG. 2 is an exploded perspective view of a rotor of the axial gap type motor related to one embodiment of the present invention.
Figure 3:
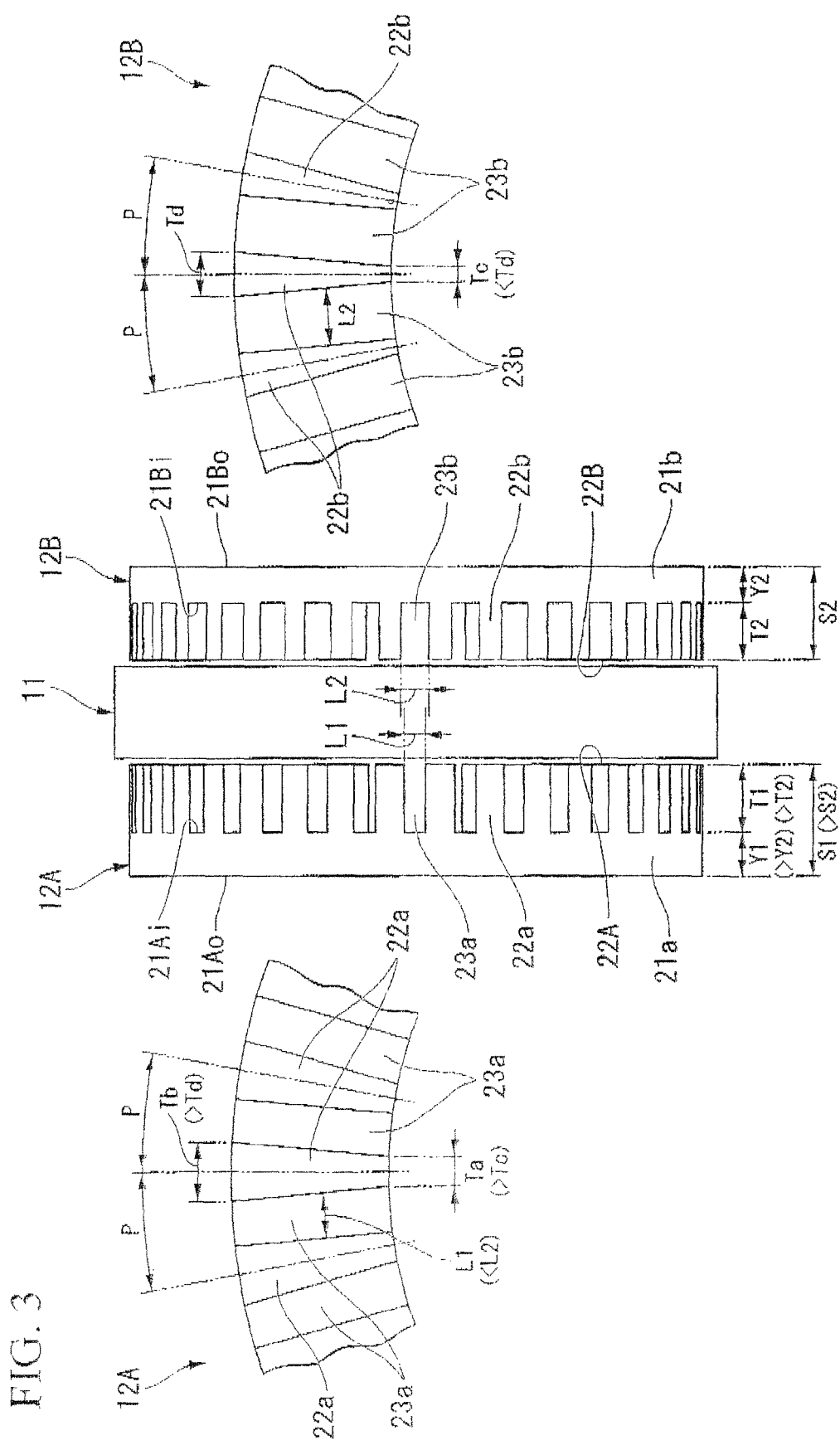
FIG. 3 is a plan view when the axial gap type motor related to one embodiment of the present invention is seen in the radial direction.

As shown in, for example, FIG. 1 to FIG. 3, the axial gap type motor 10 according to this embodiment includes a substantially annular rotor 11 rotatably provided around a rotation axis O of the axial gap type motor 10, and a pair of first stator 12A and second stator 12B arranged so as to face each other such that the stators sandwich the rotor 11 via a predetermined gap from both sides in the direction of the rotation axis O. The pair of first stator 12A and second stator 12B have a plurality of phases of stator windings which generate a rotating magnetic field which rotates the rotor 11.

The axial gap type motor 10 is mounted on vehicles, such as a hybrid vehicle and an electric vehicle, as driving sources. In this case, an output shaft of the motor is connected to an input shaft of a gear transmission (not shown), and thereby, the driving force of the axial gap type motor 10 is transmitted to a driving wheel (not shown) of a vehicle via a gear transmission.

When a driving force is transmitted to the axial gap type motor 10 from the driving-wheel side during deceleration of a vehicle, the axial gap type motor 10 functions as a power generator to generate a so-called regenerative braking force, and recovers the kinetic energy of a vehicle body as electrical energy (regeneration energy). For example, in the hybrid vehicle, when the rotary shaft of the axial gap type motor 10 is connected to a crankshaft of an internal combustion engine (not shown), the axial gap type motor 10 functions as a power generator to generate power generation energy even in a case where the output of the internal combustion engine is transmitted to the axial gap type motor 10.

The first stator 12A includes a substantially annular plate-like yoke portion 21a, a plurality of teeth 22a which protrude toward the rotor 11 in the direction of the rotation axis O from positions with predetermined intervals (predetermined pitches P) in the peripheral direction on the facing surface of the yoke portion 21a which faces the rotor 11 and which extends in the radial direction, and stator windings (not shown) mounted on slots 23a between the teeth 22a and 22a which are adjacent to each other in the peripheral direction.

The second stator 12B includes a substantially annular plate-like yoke portion 21b, a plurality of teeth 22b which protrude toward the rotor 11 in the direction of the rotation axis O from positions with predetermined intervals (predetermined pitches P equal to those of the first stator 12A) in the peripheral direction on the facing surface of the yoke portion 21b which faces the rotor 11 and which extends in the radial direction, and stator windings (not shown) mounted on slots 23b between the teeth 22b and 22b which are adjacent to each other in the peripheral direction.

Each of the states 12A and 12B is, for example, a 6N type having six main poles (for example, $U^+, V^+, W^+, U^-, V^-, W^-$). In this type, $U^+, V^+$, and $W^+$ poles of one stator (for example, the first stator 12A) are set so as to face $U^-, V^-$, and $W^-$ poles, respectively, of the other stator (for example, the second stator 12B) in the direction of the rotation axis O.

For example, three teeth 22a, 22a, and 22a corresponding to one of $U^+, V^+$, and $W^+$ poles and $U^-, V^-$, and $W^-$ poles of the first stator 12A, and three teeth 22b, 22b, and 22b corresponding to the other of $U^+, V^+, W^+$ poles and $U^-, V^-$, and $W^-$ poles of the second stator 12B are set to face each other in the direction of the rotation axis O. An electric current application state to the teeth 22a of the first stator 12A and the teeth 22b of the second stator 12B which face each other in the direction of the rotation axis O is set so as to be in an inverted state at an electrical angle.

For example, as shown in FIG. 3, the thicknesses of the yoke portions 21a and 21b of the states 12A and 12B in the direction of the rotation axis O are equal to each other outward from the radial inside. The thickness Y1 of the yoke portion 21a of the first stator 12A in the direction of the rotation axis O is greater man the thickness Y2 of the yoke portion 21b of the second stator 12B in the direction of the rotation axis O (that is, Y1>Y2). End faces of the yoke portions 21a and 21b of the stators 12A and 12B on the side of the rotor 11 inward in the direction of the rotation axis O, i.e., rotor facing surfaces 21Ai and 21Bi are parallel to the radial direction. End faces 21Ao and 21Bo of the yoke portions 21a and 21b outward in the direction of the rotation axis O are parallel to the radial direction.

The thicknesses of the teeth 22a and 22b of the stators 12A and 12B in the direction of the rotation axis O are equal to each other outward from the radial inside. The thickness T1 of the teeth 22a of the first stator 12A in the direction of the rotation axis O is greater than the thickness T2 of the teeth 22b of the second stator 12B in the direction of the rotation axis O (that is, T1>T2). End faces of the teeth 22a and 22b of the stators 12A and 12B on the side of the rotor 11 inward in the direction of the rotation axis O, i.e., rotor facing surfaces 22A and 22B are parallel to the radial direction.

As a result, the thickness S1 (=Y1+T1) of the first stator 12A in the direction of the rotation axis O is greater than the thickness S2 (=Y2+T2) of the second stator 12B in the direction of the rotation axis O.

The rotor facing surfaces 22A and 22B of the teeth 22a and 22b are substantially fan-shaped. The peripheral width of the rotor facing surfaces 22A and 22B increases gradually outward from the radial inside.

The inner-peripheral-side width Ta of the rotor facing surfaces 22A of the first stator 12A is greater than the inner-peripheral-side width Tc of the rotor facing surface 22B of the second stator 12B. The outer-peripheral-side width Tb of the rotor facing surfaces 22A of the first stator 12A is greater than the outer-peripheral-side width Td of the rotor facing surface 22B of the second stator 12B.

Accordingly, the peripheral width (slot width) L1 of the slots 23a of the first stator 12A is smaller than the peripheral width (slot width) L2 of the slots 23b of the second stator 12B. That is, the peripheral positions of peripheral ends of the teeth 22a and 22b which face each other in the direction of the rotation axis O are different from each other.

The thickness T1 (that is, the depth of the slots 23a in the direction of the rotation axis O: slot depth) in the direction of the rotation axis O of the teeth 22a of the first stator 12A is greater than the thickness T2 (that is, the depth of the slots 23b in the direction of the rotation axis O: slot depth) in the direction of the rotation axis O of the teeth 22b of the second stator 12B. The numbers of turns of the stator windings which can be mounted to the insides of the slots 23a and 23b are set to be equal to each other.

The change ratio between the thickness Y1 of the yoke portion 21a of the first stator 12A in the direction of the rotation axis O, and the thickness Y2 of the yoke portion 21b of the second stator 12B in the direction of the rotation axis O, and the change ratio between the peripheral width (for example, the outer-peripheral-side width Tb) of the teeth 22a of the first stator 12A, and the peripheral width (for example, the outer-peripheral-side width Td) of the teeth 22b of the second stator 12B are, for example, equal to each other (Y1: Y2=Tb:Td).

That is, as the peripheral width of the teeth 22a of the first stator 12A becomes relatively greater compared with that of the teeth 22b of the second stator 12B, the thickness of the yoke portion 21a of the first stator 12A in the direction of the rotation axis becomes relatively greater compared with that of the yoke portion 21b of the second stator 12B. As a result, the magnetic flux density between the yoke portions 21a and 21b of the stators 12A and 12B is equalized, and passing of a magnetic flux in an unintended direction, such as a radial direction, is prevented.

For example, as for the stators 12A and 12B, the ratio of the slot width L1 and the slot width L2 is set to (L1:L2=6:8). The ratio (that is, the ratio of the thickness T1 of the teeth 22a and the thickness T2 of the teeth 22b) of the slot depth is set to (T1:T2=20:15). The ratio of the thickness Y1 of the yoke portion 21a in the direction of the rotation axis O and the thickness Y2 of the yoke portion 21b of the second stator 12B in the direction of the rotation axis O is set to (Y1:Y2=12: 10.5).

For example, as shown in FIG. 2, the rotor 11 includes a plurality of main magnet portions 31, a plurality of auxiliary magnet portions 32, and a rotor frame 33 made of a nonmagnetic material. The main magnet portions 31 and the auxiliary magnet portions 32 are accommodated in the rotor frame 33 in the state where they are alternately arranged in the peripheral direction.

As shown in, for example, FIG. 2, the rotor frame 33 includes an inner-peripheral-side tubular portion 35 and an outer-peripheral-side tubular portion 36 which are connected by a plurality of radial direction ribs 34 arranged at predetermined intervals in the peripheral direction, and a connecting portion 37 which is formed in the shape of a circular ring plate which protrudes inward from an inner peripheral surface of the inner-peripheral-side tubular portion 35, and is connected to an external driving shaft (for example, an input shaft of a gear transmission of a vehicle, etc.).

In this embodiment, the inner-peripheral-side tubular portion 35 of the rotor frame 33 is connected to the external driving shaft. Therefore, the radial inside of the radial ribs 34 is shaft portion side, and the radial outside of the radial ribs 34 is rim portion side.

The sectional shapes of the radial ribs 34 in the radial direction are equal inward from the radial outside.

Each of the main magnet portions 31 includes a substantially fan-shaped plate-like main permanent magnet piece 41 magnetized, for example, in the thickness direction (that is, the direction of the rotation axis O), and a pair of magnetic members 42 and 42 sandwiching the main permanent magnet piece 41 from both sides in the thickness direction. The main permanent magnet pieces 41 and 41 of the main magnet portions 31 and 31 which are adjacent to each other in the peripheral direction are set such that their magnetizing directions become different directions from each other.

The pair of magnetic members 42 and 42 are substantially fan-shaped such that their sectional shape in the thickness direction is the same as that of the main permanent magnet piece 41.

The plurality of main magnet portions 31 accommodated within the rotor frame 33 are arranged such that they are sandwiched from both sides in the radial direction by the inner-peripheral-side tubular portion 35 and the outer-peripheral-side tubular portion 36, and are adjacent to each other via the radial ribs 34 in the peripheral direction.

Within the rotor frame 33, the main permanent magnet piece 41 of each main magnet portion 31 is sandwiched from both sides in the peripheral direction by two radial ribs 34, and the thickness of the main permanent magnet piece 41 in the direction of the rotation axis O is constant inward from the radial outside, similarly to the radial ribs 34.

The thickness of the magnetic member 42 in the direction of the rotation axis O is constant outward from the radial inside.

Each auxiliary magnet portion 32 includes a pair of auxiliary permanent magnet pieces 43 and 43 which sandwich the radial rib 34 from both sides in the direction of the rotation axis O within the rotor frame 33. A pair of auxiliary permanent magnet pieces 43 and 43 which face each other in the direction of the rotation axis O are respectively magnetized in the direction of the rotation axis O, and in a direction (substantially peripheral direction) orthogonal to the radial direction, and these magnetizing directions are made different from each other.

The thickness of the auxiliary magnetic member 43 in the direction of the rotation axis O is constant outward from the radial inside, and the peripheral width of the auxiliary permanent magnet piece 43 is constant outward from the radial inside.

The auxiliary permanent magnet pieces 43 and 43 of the auxiliary magnet portions 32 and 32 which are adjacent to each other in the peripheral direction sandwich the magnetic member 42 of the main magnet portion 31 from both sides in the peripheral direction, within the rotor frame 33. The sectional shapes along the periphery of auxiliary permanent magnet piece 43 and the magnetic member 42 have substantially rectangular shapes.

In FIG. 2 which shows a state where the rotor frame 33 and components other than rotor frame 33 (that is, the main magnet portions 31 and the auxiliary magnet portions 32), of the rotor 11 are separated, a space portion 34a in which the radial rib 34 of the rotor frame 33 is formed between a pair of auxiliary permanent magnet pieces 43 and 43 which face each other in the direction of the rotation axis O, and between the main permanent magnet pieces 41 and 41 which are adjacent to each other in the peripheral direction.

The magnetizing directions of a pair of auxiliary permanent magnet pieces 43 and 43 which face each other in the peripheral direction via the magnetic member 42 are made different from each other.

One pair of auxiliary permanent magnet pieces 43 and 43 arranged on one side in the direction of the rotation axis O are arranged such that the same pole as the pole on one side of the main permanent magnet piece 41 magnetized in the direction of the rotation axis O are made to face each other. One pair of auxiliary permanent magnet pieces 43 and 43 arranged on the other side in the direction of the rotation axis O are arranged such that the same pole as the pole on the other side of the main permanent magnet piece 41 magnetized in the direction of the rotation axis O are made to face each other.

That is, for example, with the main permanent magnet piece 41 having an N pole on one side and an S pole on the other side in the direction of the rotation axis O, one pair of auxiliary permanent magnet pieces 43 and 43 which sandwich the magnetic member 42 from both sides in the peripheral direction on one side in the direction of the rotation axis O are arranged such that N poles face each other in the peripheral direction. One pair of auxiliary permanent magnet pieces 43 and 43 which sandwich the magnetic member 42 from both sides in the peripheral direction on the other side in the direction of the rotation axis O are arranged such that S poles face each other in the peripheral direction.

As a result, the magnetic fluxes of the main permanent magnet piece 41 and the auxiliary permanent magnet pieces 43 and 43 are converged by a magnetic flux lens effect obtained by a so-called Halbach arrangement of permanent magnets, and the effective magnetic fluxes interlinked to the stators 12 and 12 respectively increase.

In this embodiment, the thicknesses of the radial rib 34 of the rotor frame 33 and the main permanent magnet piece 41 of each main magnet portion 31 in the direction of the rotation axis O are constant inward from the radial outside, and accordingly, the width of the inner-peripheral-side tubular portion 35 of the rotor frame 33 in the direction of the rotation axis O is constant to the width of the outer-peripheral-side tubular portion 36 in the direction of the rotation axis O.

That is, between the inner-peripheral-side tubular portion 35 and the outer-peripheral-side tubular portion 36 of the rotor frame 33, the radial cross-sectional area of the rotor 11 has a predetermined constant value, and is constant inward from the radial outside.

As described above, according to the axial gap type motor 10 of this embodiment, with respect to the first stator 12A and the second stator 12B, the peripheral width and slot width of the teeth 22a and 22b are set to be different values in a state where the peripheral pitch P of each of the teeth 22a and 22b is made equal. The peripheral position of the peripheral direction end of mutual teeth 22a which faces in the direction of the rotation axis O, and 22b is different, and thus, cogging torque and torque ripples can be suppressed.

The slot width in the first stator 12A becomes relatively smaller compared with that in the second stator 12B. Accordingly, the slot depth in the first stator in the direction of the rotation axis O becomes relatively greater compared with that in the second stator. Thereby, the numbers of turns of the stator windings which are mounted to the slots 23a and 23b, respectively, are equal to each other. The electric current application states of the stator windings can also be set to be in the same state.

Moreover, as the peripheral width of the teeth 22a of the first stator 12A becomes relatively greater compared with that of the teeth 22b of the second stator 12B, the thickness of the yoke portion 21a of the first stator 12A in the direction of the rotation axis becomes relatively greater compared with that of the yoke portion 21b of the second stator 12B. As a result, the magnetic flux density between the yoke portions 21a and 21b of the stators 12A and 12B is equalized, and a desired magnetic circuit can be made proper. Further, passing of a magnetic flux in an unintended direction, such as a radial direction, is prevented, and a desired torque can be easily ensured.

In the above-described embodiment, the auxiliary magnet portions 32 may be omitted. Otherwise, any one of the pair of auxiliary permanent magnet pieces 43 and 43 constituting the auxiliary magnet portions 32 may be omitted.

Hereinafter, a second embodiment of an axial gap type motor of the present invention will be described with reference to the accompanying drawings.

Figure 4:
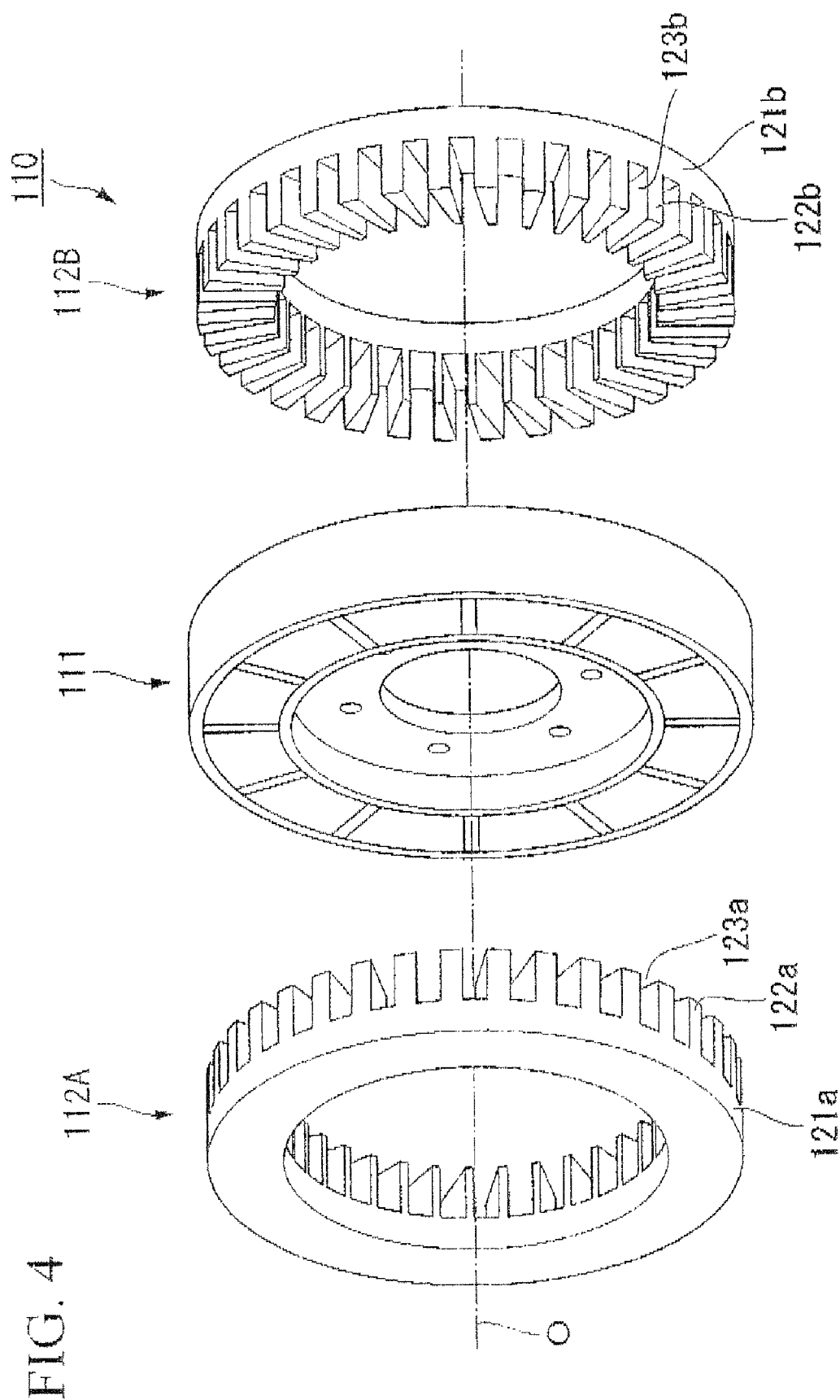
FIG. 4 is a perspective view of the axial gap type motor related to one embodiment of the present invention.
Figure 5:
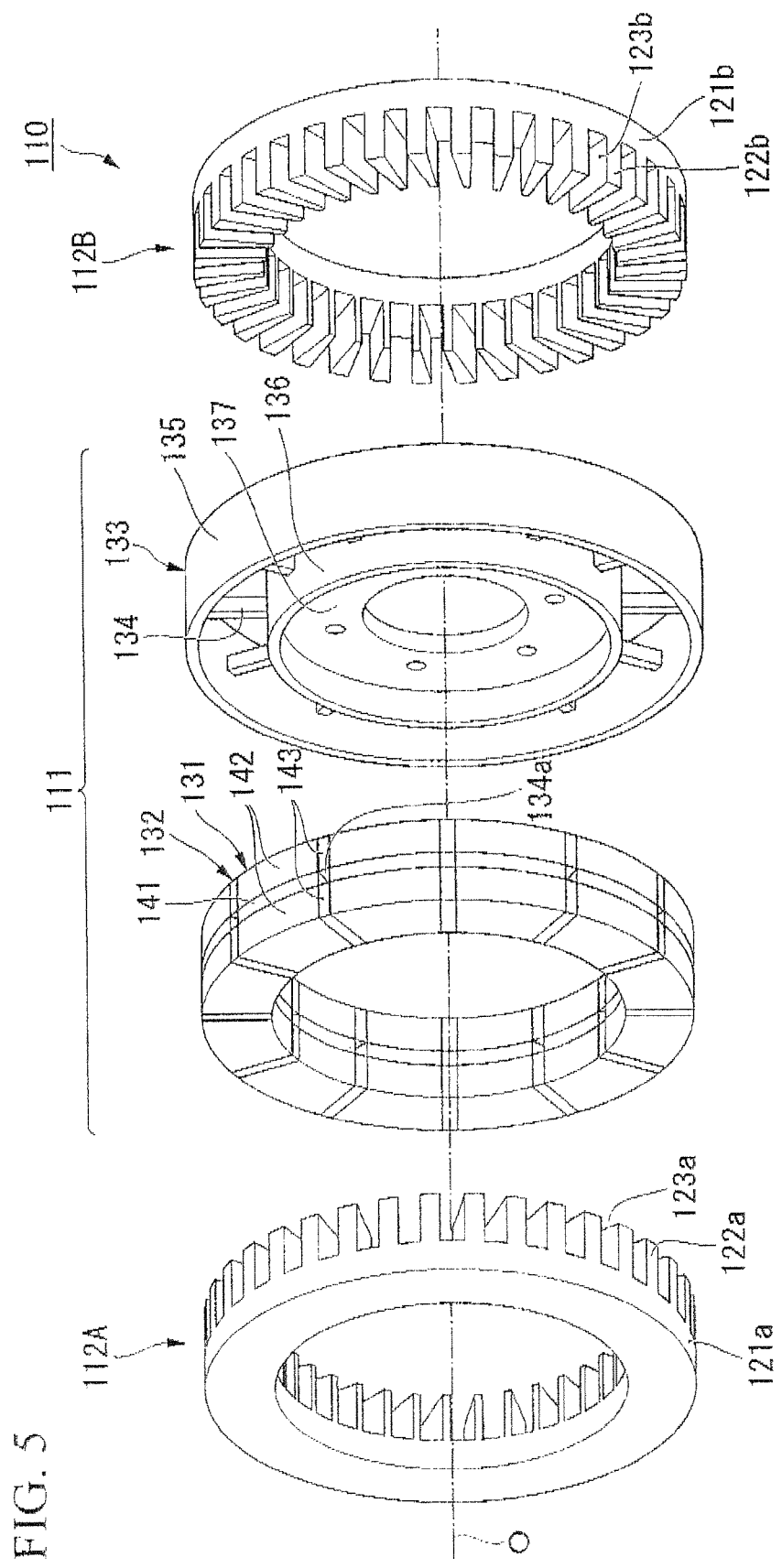
FIG. 5 is an exploded perspective view of a rotor of the axial gap type motor related to one embodiment of the present invention.

As shown in, for example, FIG. 4 and FIG. 5, the axial gap type motor 110 according to this embodiment includes a substantially annular rotor 111 rotatably provided around a rotation axis O of the axial gap type motor 110, and a pair of first stator 112A and second stator 112B arranged so as to face each other such that the stators sandwich the rotor 111 from both sides in the direction of the rotation axis O. The pair of stators 112A and 112B have a plurality of phases of stator windings which generate a rotating magnetic field which rotates the rotor 111.

The axial gap type motor 110 is mounted on vehicles, such as a hybrid vehicle and an electric vehicle, as driving sources. In this case, an output shaft of the motor is connected to an input shaft of a gear transmission (not shown), and thereby, the driving force of the axial gap type motor 110 is transmitted to a driving wheel (not shown) of a vehicle via a gear transmission.

When a driving force is transmitted to the axial gap type motor 110 from the driving-wheel side during deceleration of a vehicle, the axial gap type motor 110 functions as a power generator to generate a so-called regenerative braking force, and recovers the kinetic energy of a vehicle body as electrical energy (regeneration energy). For example, in the hybrid vehicle, when the rotary shaft of the axial gap type motor 110 is connected to a crankshaft of an internal combustion engine (not shown), the axial gap type motor 110 functions as a power generator to generate power generation energy even in a case where the output of the internal combustion engine is transmitted to the axial gap type motor 110.

The stators 112A and 112B have the same shape. The first stator 112A includes a substantially annular plate-like yoke portion 121a, a plurality of teeth 122a which protrude toward the rotor 111 in the direction of the rotation axis O from positions with predetermined intervals (predetermined teeth pitches P) in the peripheral direction on the facing surface of the yoke portion 121a which faces the rotor 111 and which extends in the radial direction, and stator windings (not shown) mounted on slots 123a between the teeth 122a and 122a which are adjacent to each other in the peripheral direction.

The second stator 112B includes a substantially annular plate-like yoke portion 121b, a plurality of teeth 122b which protrude toward the rotor 111 in the direction of the rotation axis O from positions with predetermined intervals (predetermined teeth pitches P equal to those of the first stator 112A) in the peripheral direction on the facing surface of the yoke portion 121b which faces the rotor 111 and which extends in the radial direction, and stator windings (not shown) mounted on slots 123b between the teeth 122b and 122b adjacent to each other in the peripheral direction.

Each of the stators 112A and 112B is, for example, a 6N type having six main poles (for example, $U^+, V^+, W^+, U^-, V^-, W^-$). In this type, $U^+, V^+$, and $W^+$ poles of one stator (for example, the first stator 112A) are set so as to face $U^-, V^-$, and $W^-$ poles, respectively, of the other stator (for example, the second stator 112B) in the direction of the rotation axis O.

For example, three teeth 122a corresponding to one of $U^+, V^+$, and $W^+$ poles and $U^-, V^-$, and $W^-$ poles of the first stator 112A, and three teeth 122b corresponding to the other of $U^+, V^+, W^+$ poles and U–, V–, and W– poles of the second stator 112B are set to face each other in the direction of the rotation axis O. An electric current application state to the teeth 122a of the first stator 112A and the teeth 122b of the second stator 112B which face each other in the direction of the rotation axis O is set so as to be an inverted state at an electrical angle.

The teeth 122a and 122b are inclined by a predetermined skew angle θ with respect to the radial direction, and the angle formed between the central axis R of the teeth 122a and 122b and the radial direction becomes the skew angle θ. As a result, as shown in, for example, in FIG. 6, in a case where the first stator 112A and the second stator 112B which sandwich the rotor 111 from both sides in the direction of the rotation axis O are seen from one side in the direction of the rotation axis O, the inclination directions of the teeth 122a of the first stator 112A and the teeth 122b of the second stator 112B with respect to the radial direction become opposite directions from each other.

A predetermined skew angle θ is set to, for example, one fourth of the teeth pitch P. Since the teeth pitch is P=60 (edeg: electrical angle) in the 6N-type stators 112A and 112B, the skew angle becomes θ (=P/4)=15 (edeg: electrical angle)=2.5 (deg: machine angle).

As shown in, for example, FIG. 5, the rotor 111 includes a plurality of main magnet portions 131, a plurality of auxiliary magnet portions 132 and a rotor frame 133 made of a non-magnetic material. The main magnet portions 131 and the auxiliary magnet portions 132 are accommodated in the rotor frame 133 in the state where they are alternately arranged in the peripheral direction.

The rotor frame 133 includes an inner-peripheral-side tubular portion 135 and an outer-peripheral-side tubular portion 136 which are connected by a plurality of radial direction ribs 134 arranged at predetermined intervals in the peripheral direction, and a connecting portion 137 which is formed in the shape of a circular ring plate which protrudes inward from an inner peripheral surface of the inner-peripheral-side tubular portion 135, and is connected to an external driving shaft (for example, an input shaft of a gear transmission of a vehicle, etc.).

In this embodiment, since the inner-peripheral-side tubular portion 135 of the rotor frame 133 is connected to an external driving shaft, the radial inside of the radial ribs 134 is shaft portion side, and the radial outside of the radial ribs 134 is rim portion side.

The sectional area of the radial ribs 134 in the radial direction is set to be a predetermined constant value in the radial direction. The peripheral width of the radial ribs 134 is made equal to the peripheral width of auxiliary permanent magnet pieces 143 to be described later. The thickness of the radial ribs 134 in the direction of the rotation axis O is set to be a predetermined constant value in the radial direction.

Each of the main magnet portions 131 includes a substantially fan-shaped plate-like main permanent magnet piece 141 magnetized in the thickness direction (that is, the direction of the rotation axis O), and a pair of substantially fan-shaped plate-like magnetic members 142 and 142 sandwiching the main permanent magnet piece 141 from both sides in the thickness direction. The main permanent magnet pieces 141 and 141 of the main magnet portions 131 and 131 which are adjacent to each other in the peripheral direction are set such that their magnetizing directions become different directions from each other.

The plurality of main magnet portions 131 accommodated within the rotor frame 133 are arranged such that they are sandwiched from both sides in the radial direction by the inner-peripheral-side tubular portion 135 and the outer-peripheral-side tubular portion 136, and are adjacent to each other via the radial ribs 134 in the peripheral direction. Within the rotor frame 133, the main permanent magnet piece 141 of each main magnet portion 131 is sandwiched from both sides in the peripheral direction by two radial ribs 134, and the thickness of the main permanent magnet piece 141 in the direction of the rotation axis O is set to be a predetermined constant value in the radial direction, similarly to the radial ribs 134.

The thickness of the magnetic member 142 in the direction of the rotation axis O is set to be a predetermined constant value in the radial direction, similarly to auxiliary permanent magnet pieces 143 to be described later.

Figure 6:
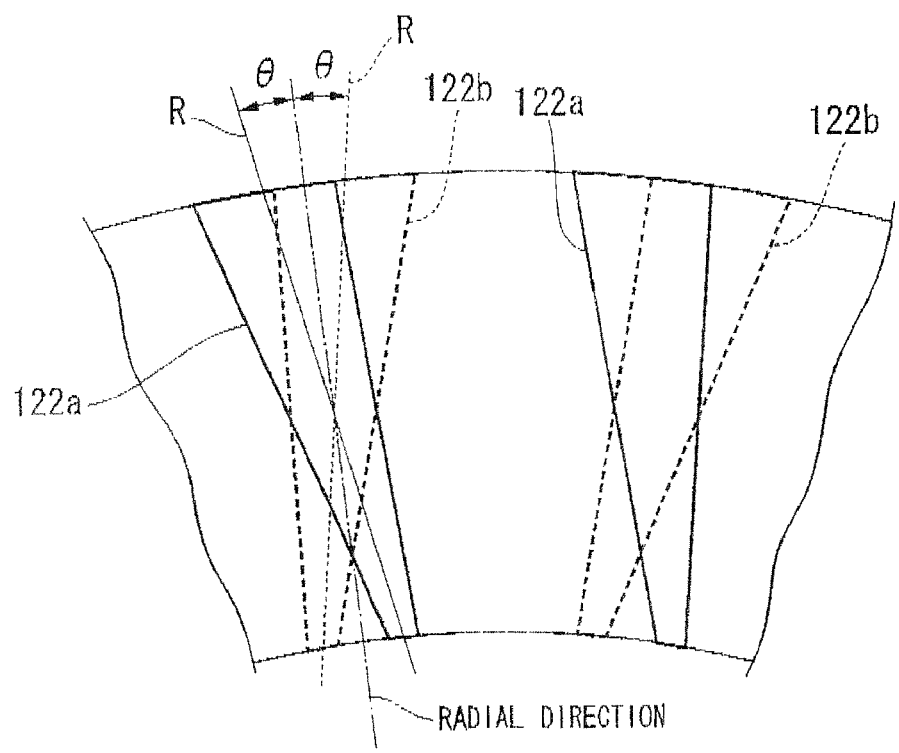
FIG. 6 is a plan view of major portions when a first stator and a second stator which sandwich the rotor of the axial gap type motor related to one embodiment of the present invention from both sides in the direction of a rotation axis is seen from one side in the direction of the rotation axis.

Each auxiliary magnet portion 132, as shown in, for example, FIG. 5 and FIG. 6, includes a pair of auxiliary permanent magnet pieces 143 and 143 which sandwich the radial rib 134 from both sides in the direction of the rotation axis O within the rotor frame 133. Pair of auxiliary permanent magnet pieces 143 and 143 which face each other in the direction of the rotation axis O are respectively magnetized, for example, in the direction of the rotation axis O, and in a direction (substantially peripheral direction) orthogonal to the radial direction, and these magnetizing directions are made different from each other.

The thickness of the auxiliary permanent magnet piece 143 in the direction of the rotation axis O is a predetermined constant value in the radial direction similarly to the magnetic member 42, and the peripheral width of the auxiliary permanent magnet piece 143 is made equal to the peripheral width of the radial ribs 134.

The auxiliary permanent magnet pieces 143 and 143 of the auxiliary magnet portions 132 and 132 which are adjacent to each other in the peripheral direction sandwich the magnetic member 142 of the main magnet portion 131 from both sides in the peripheral direction, within the rotor frame 133.

In FIG. 5 which shows a state where the rotor frame 133 and components other than rotor frame 133 (that is, the main magnet portions 131 and the auxiliary magnet portions 132), of the rotor 111 are separated, a space portion 134a in which the radial rib 134 of the rotor frame 133 is formed between a pair of auxiliary permanent magnet pieces 143 and 143 which face each other in the direction of the rotation axis O, and between the main permanent magnet pieces 141 and 141 which are adjacent to each other in the peripheral direction.

The magnetizing directions of a pair of auxiliary permanent magnet pieces 143 and 143 which face each other in the peripheral direction via the magnetic member 142 are made different from each other.

One pair of auxiliary permanent magnet pieces 143 and 143 arranged on one side in the direction of the rotation axis O are arranged such that the same pole as the pole on one side of the main permanent magnet piece 141 magnetized in the direction of the rotation axis O are made to face each other, and one pair of auxiliary permanent magnet pieces 143 and 143 arranged on the other side in the direction of the rotation axis O are arranged such that the same pole as the pole on the other side of the main permanent magnet piece 141 magnetized in the direction of the rotation axis O are made to face each other.

That is, for example, with the main permanent magnet piece 141 having an N pole on one side and an S pole on the other side in the direction of the rotation axis O, one pair of auxiliary permanent magnet pieces 143 and 143 which sandwich the magnetic member 142 from both sides in the peripheral direction on one side in the direction of the rotation axis O are arranged such that N poles face each other in the peripheral direction, and one pair of auxiliary permanent magnet pieces 143 and 143 which sandwich the magnetic member 142 from both sides in the peripheral direction on the other side in the direction of the rotation axis O are arranged such that S poles face each other in the peripheral direction.

As a result, the magnetic fluxes of the main permanent magnet piece 141 and the auxiliary permanent magnet pieces 143 and 143 are converged by a magnetic flux lens effect obtained by a so-called Halbach arrangement of permanent magnets, and the effective magnetic fluxes interlinked to the stators 112A and 112B respectively increase.

In this embodiment, in a case where the first stator 112A and the second stator 112B which sandwich the rotor 111 from both sides in the direction of the rotation axis O are seen from one side in the direction of the rotation axis O, the central axis R of the teeth 122a of the first stator 112A and the central axis R of the teeth 122b of the second stator 112B intersect each other. Occurrence of overlapping of peripheral edges of the teeth 122a of the first stator 112A and peripheral edges of the teeth 122b of the second stator 112B is suppressed.

Figure 7:
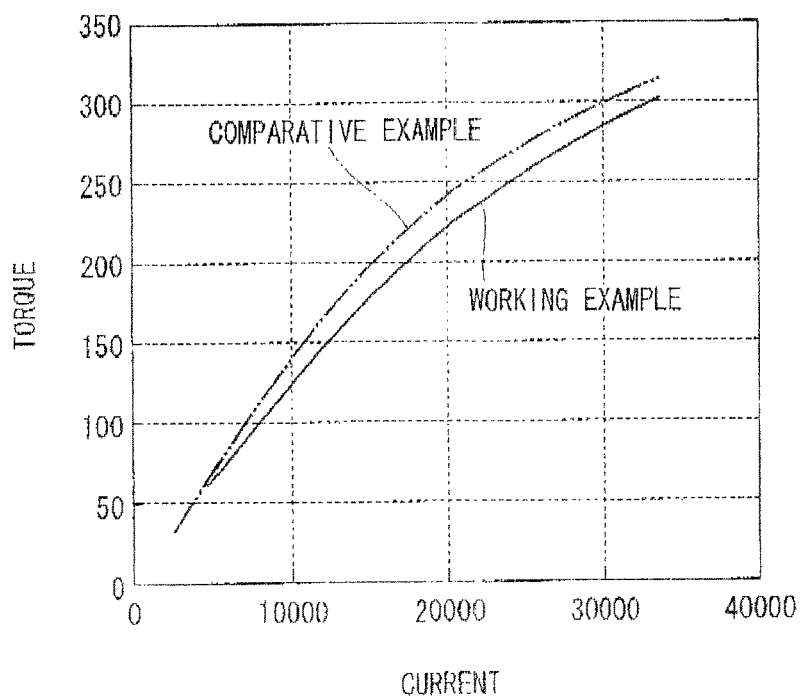
FIG. 7 is a graph showing an example of the correspondence relationship between electric currents applied to the first stator and the second stator in a working example and a comparative example of the axial gap type motor related to one embodiment of the present invention, and the torque of the axial gap type motor.
Figure 8:
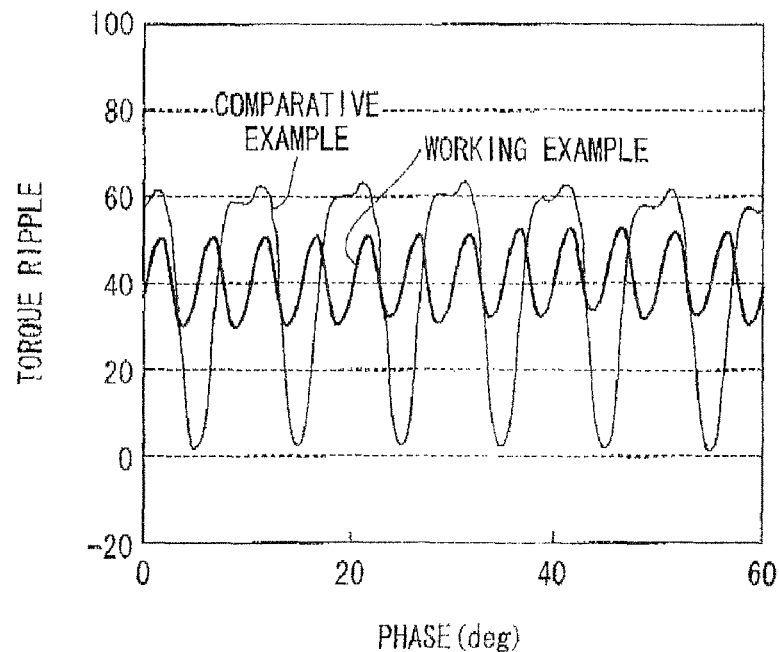
FIG. 8 is a graph showing an example of the waveform of torque ripples in the working example and comparative example of the axial gap type motor related to one embodiment of the present invention.
Figure 9:
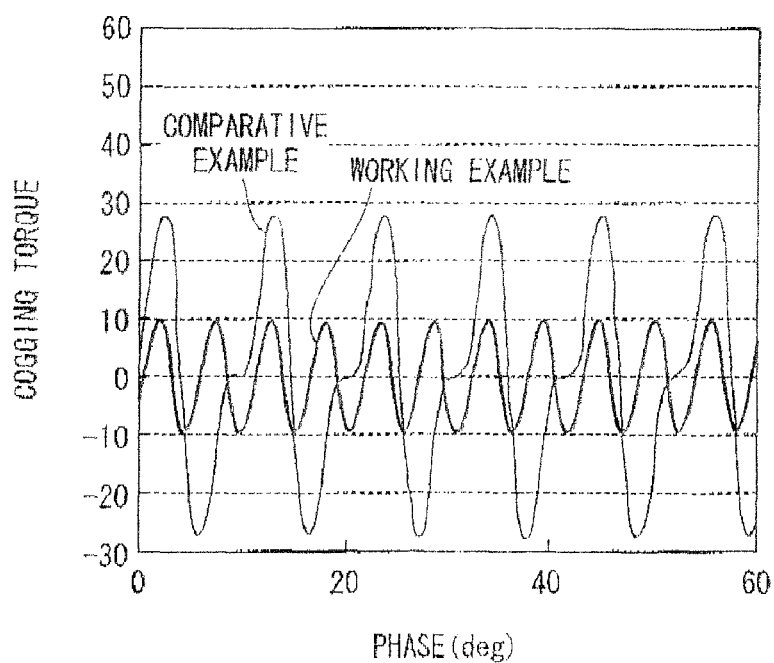
FIG. 9 is a graph showing an example of the waveform of cogging torque in the working example and comparative example of the axial gap type motor related to one embodiment of the present invention.

As a result, in a case where the axial gap type motor 110 in the above-described embodiment is adopted as a working example, and the axial gap type motor in which the made skew angle θ is set to zero in the above-described embodiment is adopted as a comparative example, as shown in, for example, in FIG. 7, the output of torque almost equal to that of the comparative example can be output in the working example. In addition to the above, at the time of application of an electric current to the stator windings of the stators 112A and 112B shown in, for example, FIG. 8, and no application of an electrical current to the stator windings of the stators 112A and 112B shown in, for example, FIG. 9, torque ripples and cogging torque can be effectively reduced in the working example compared with the comparative example.

As described above, according to the axial gap type motor 110 according to this embodiment, in a case where the first stator 112A and the second stator 112B which sandwich the rotor 111 from both sides in the direction of the rotation axis O are seen from one side in the direction of the rotation axis O, the teeth 122a of the first stator 112A and the teeth 122b of the second stator 112B are arranged in a skew state where they are inclined in directions opposite to each other. For example, compared with the comparative example in which the skew angle θ is zero, occurrence of overlapping of peripheral edges of the teeth 122a of the first stator 112A and peripheral edges of the teeth 122b of the second stator 112B can be suppressed. Also, sudden changes in the magnetic resistance between the rotor 111 and the stators 112A and 112B during the rotation of the rotor 111 can be suppressed, and cogging torque and torque ripples can be reduced.

Figure 10:
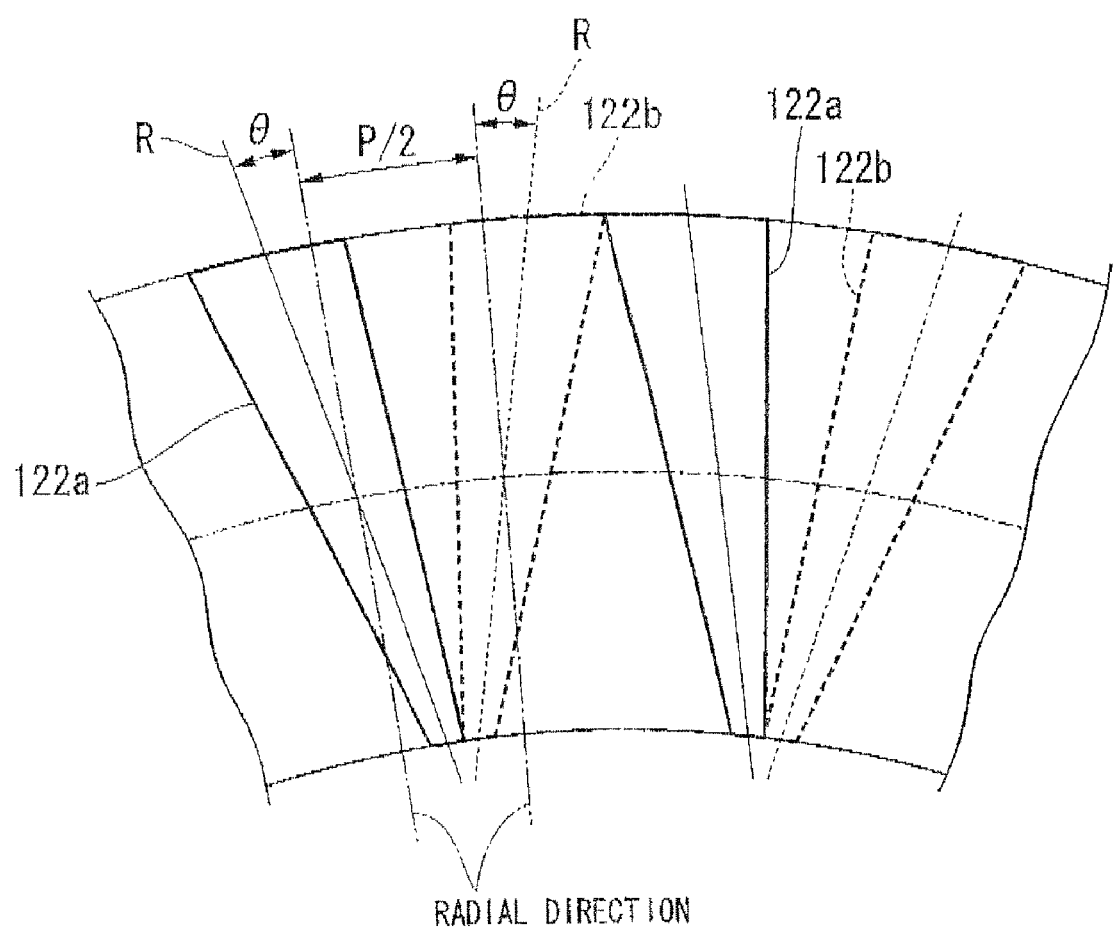
FIG. 10 is a plan view of major portions when the first stator and the second stator which sandwich the rotor of the axial gap type motor related to a modified example of the embodiment of the present invention from both sides in the direction of a rotation axis is seen from one side in the direction of the rotation axis.

In the above-described embodiment, like a modified example shown, for example, in FIG. 10, the teeth 122a of the first stator 112A and the teeth 122b of the second stator 112B may have a predetermined phase difference, for example, a phase difference of ½ of the teeth pitch P.

In this case, occurrence of overlapping of the peripheral edges of the teeth 122a of the first stator 112A and the peripheral edges of the teeth 122b of the second stator 112B can be further suppressed. Also, cogging torque and torque ripples can be further reduced.

In the above-described embodiment, the stators 112A and 112B are a 6-N type having six main poles (for example, $U^+$, $V^+$, $W^+$, $U^-$, $V^-$, $W^-$). However, the present invention is not limited thereto, and the stators may have other pairs of poles. For example, in a 3N type having three main poles, the teeth pitch is P=120 (edeg: electrical angle). Therefore, the skew angle becomes θ (=P/4)=30 (edeg: electrical angle).

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An axial gap motor comprising:
   a rotor rotatable around a rotation axis; and
   a first stator and a second stator arranged so as to sandwich the rotor therebetween in the direction of the rotation axis, wherein:
   each of the first and second stators include an annular back yoke and a plurality of teeth, wherein the teeth are provided on the annular back yoke at predetermined intervals in a peripheral direction of the back yoke so as to protrude toward the rotor in the direction of the rotation axis;
   a peripheral pitch of the plurality of teeth of the first stator and the peripheral pitch of the plurality of teeth of the second stator are equal to each other; and
   wherein the first stator and the second stator, which sandwiching the rotor therebetween in the direction of the rotation axis, are seen from one side in the direction of the rotation axis, facing surfaces of the teeth of the first stator and facing surfaces of the teeth of the second stator are arranged so as not to overlap completely each other, and wherein:

a peripheral width of the teeth of the first stator is greater than a peripheral width of the teeth of the second stator; and the width of a first slot, wherein the first slot is the space between adjacent teeth in the peripheral direction of the first stator is smaller than the width of a second slot, wherein the second slot is the space between adjacent teeth in the peripheral direction of the second stator.

2. The axial gap motor according to claim 1, wherein:

a number of turns of stator windings mounted on the slot of the first stator is equal to the number of turns of stator windings mounted on the slot of the second stator; and a depth of the slot of the first stator in the direction of the rotation axis is greater than the depth of the slot of the second stator in the direction of the rotation axis.

3. The axial gap motor according to claim 1, wherein a thickness of the back yoke of the first stator in the direction of the rotation axis is greater than the thickness of the back yoke of the second stator in the direction of the rotation axis.

4. The axial gap motor according to claim 1, wherein:

the plurality of teeth of the first stator and second stator are inclined by a predetermined skew angle with respect to the radial direction; and wherein the first stator and the second stator, sandwiching the rotor therebetween in the direction of the rotation axis, are seen from one side in the direction of the rotation axis, the inclination angles of the teeth of the first stator and the teeth of the second stator with respect to the radial direction are opposite directions from each other.

5. The axial gap motor according to claim 4, wherein the teeth of the first stator and the teeth of the second stator have a phase difference of ½ of the peripheral pitch of the plurality of the teeth of the first stator and the second stator.

6. The axial gap type motor according to claim 1, wherein the rotor includes:

a plurality of main permanent magnets, whose magnetizing direction is the direction of the rotation axis, are arranged in the peripheral direction; and a plurality of auxiliary permanent magnets, whose magnetizing direction is an orthogonal direction to the direction of the rotation axis, are arranged in the vicinity of ends of the main permanent magnets.

* * * * *